Patented Feb. 26, 1924.

1,485,333

UNITED STATES PATENT OFFICE.

HENRY HICKS HURT, OF YONKERS, NEW YORK, ASSIGNOR TO ROBESON PROCESS COMPANY, OF NEW YORK, N. Y., A CORPORATION OF NEW JERSEY.

PROCESS OF DEODORIZING AND PRESERVING.

No Drawing.   Application filed May 18, 1920.   Serial No. 382,381.

*To all whom it may concern:*

Be it known that I, HENRY HICKS HURT, a citizen of the United States, residing at Yonkers, in the county of Westchester and State of New York, have invented certain new and useful Improvements in Processes of Deodorizing and Preserving, of which the following is a specification.

This invention relates to processes of deodorizing and perserving; and it comprises a method of preserving and rendering inoffensive fish, tankage, meat scrap and similar materials of animal origin, wherein such materials are treated with a waste sulfite liquor preparation; all as more fully hereinafter set forth and as claimed.

There are many low grade materials of animal origin rich in albuminoids and susceptible of undergoing putrefaction or decomposition for which it is desirable to provide a preservative giving a temporary preservative effect; something which will prevent or halt putrefaction while not making the materials permanently imputrescible. These materials, such as fish and fish scrap, meat scrap, tankage, etc., are largely used for fertilizing purposes and to render them permanently imputrescible would prevent such a use. Decay in the ground is necessary in the use of organic fertilizers. In the present invention I have devised a simple and economical method of accomplishing this purpose; of temporarily preserving animal matters against putrefaction while not permanently injuring their value for making fertilizer, for recovering oil and grease, etc. To this end I take advantage of the properties of certain preparations made from waste sulfite liquor.

Sulfite waste liquor is the technical name for the watery effluent formed in digesting wood with acid sulfite of lime or other acid sulfites in making paper pulp. In the digestion, about half the weight of the wood goes into solution to form new substances; the other half of the wood being left as paper pulp. Not much is known of the chemical nature of these bodies which unite with the acid sulfite and go into solution, though for convenience in nomenclature the new products are often called lignosulfonates. These liquors are concentrated and appear in commerce in various forms. For example, the weak liquor coming from the digester may be neutralized with a little lime and then evaporated in vacuo to the concentration desired. Usually concentration is carried to about 30°–35° Baumé, giving a thick sirupy liquid. If a dry product is wanted, this liquid may be carried to dryness in suitable ways, as by using drum dryers. Or the original vacuum concentration may be carried so far by the use of suitable apparatus as to give a dry product directly. If the original sulfite liquor was made with the aid of lime, this concentrated product contains various organic matters in the form of lime salts. I find that the organic matters of the sulfite liquor although themselves susceptible of undergoing various kinds of fermentation are able to prevent the offensive decomposition of animal matters and to halt it when already in progress. The preservative effect is not permanent, but, so to speak, temporary. If the albuminoid matter after the treatment with a sulfite liquor preparation be dried the preservative effect is then, of course, permanent, but if the material treated with sulfite liquor be used as a fertilizer, to be spread on the fields, it then undergoes the normal changes of organic matter in the soil; the treated material retains its full fertilizing value. With this fertilizing value the sulfite liquor does not interfere in any way; and indeed augments it somewhat.

While the neutralized preparations made from sulfite liquor in the manner just described may be used for my purposes, I find that they are made more effective by removing the dissolved lime or by rendering them somewhat acid; either or both. Instead of making a neutralized concentrate and then acidifying, the material may instead, be evaporated to a sirupy consistency or dryness in an acid state. It is however, more convenient to take the commercial neutralized preparations and treat them in suitable ways. For example, commercial evaporated neutralized material, made as described, may be given a treatment with a little sulfuric acid or with niter cake, (which contains acid sodium sulfate. $NaHSO_4$) to render it acid and to remove the bulk of the lime.

In making one typical material which I may use, I take commercial concentrated waste sulfite liquor and add to it cold dilute sulfuric acid in an amount sufficient to precipitate the lime present as ascertained by analysis. By taking a solution of 32.5 Baumé, on addition of sulfuric acid an acid product of about 30° Baumé is obtained. For commercial purposes 30° Baumé preparations are deemed desirable. After decanting the liquid from the resulting precipitate of calcium sulfate (sulfate of lime), it may be diluted down to any strength desired and used for the present purposes. I find that such a liquid diluted with about its own volume of water when applied to fish, etc., removes any odor of decomposition and places the albuminoid bodies in such condition as to obviate any further decomposition. By covering fish, meat scrap and the like with a layer of the liquid, leaving the two in contact for some hours, and then removing the liquid, the animal matter is left in such a condition that it will not initiate or resume putrefaction on exposure to the air for an indefinite period. If dried it will keep indefinitely. But whether dry or moist, if placed in the ground it then undergoes the normal series of changes which give it fertilizing value. Allowing the animal matter and the sulfite liquor preparation to stand in contact for some time is only necessary in the case of coarse material. If the animal matter be sufficiently fine, or if it be ground with the sulfite liquor, the effect which I desire to produce takes only a few minutes.

As a rule I find it necessary to use about 10 to 15 parts of commercial 30° Baumé liquor (made as described) for each 100 parts of albuminoid animal matter; or the equivalent amount of a dry preparation. Inasmuch as animal matters to be treated are usually more or less moist and may be quite wet, in such cases the use of a dry sulfite liquor preparation, in lieu of a liquid, has distinct advantages. Such a dry preparation may be made by drying on a drum drier or other suitable ways. Or the original sulfite liquor may be simply evaporated to dryness.

Neutral commercial sulfite liquor preparation are better adapted for treating garbage which frequently contains much vegetable matter, than for treating animal matter itself. Because of the vegetable matter garbage in decomposing frequently turns acid whereas animal matter is apt to become alkaline in putrefaction. In treating decomposing animal matter with the acidified preparations decomposition is arrested at once and such ammonia or volatile amines as may have previously formed are arrested and retained by the acid constituents of the liquor.

The described property of sulfite liquor preparations is useful in many relations as in fertilizer factories, rendering establishments, garbage handling, and in fact wherever a nuisance due to putrefying animal matter is to be prevented or obviated.

What I claim is:—

1. The process of temporarily preserving and deodorizing albuminoid animal matter which consists in applying to the same a sulfite waste liquor preparation.

2. The process of temporarily preserving and deodorizing albuminoid animal matter which consists in applying to the same a sulfite waste liquor preparation substantially free of lime.

3. The process of temporarily preserving and deodorizing albuminoid animal matter which consists in applying to the same an acid sulfite waste liquor preparation.

4. The process of temporarily preserving and deodorizing albuminoid animal matter which consists in applying to the same an acid sulfite waste liquor preparation substantially free of lime.

In testimony whereof I affix my signature.

HENRY HICKS HURT.